Feb. 11, 1936.  V. HUDELEY ET AL  2,030,795
COLOR CINEMATOGRAPHY
Filed Jan. 6, 1934  2 Sheets-Sheet 2
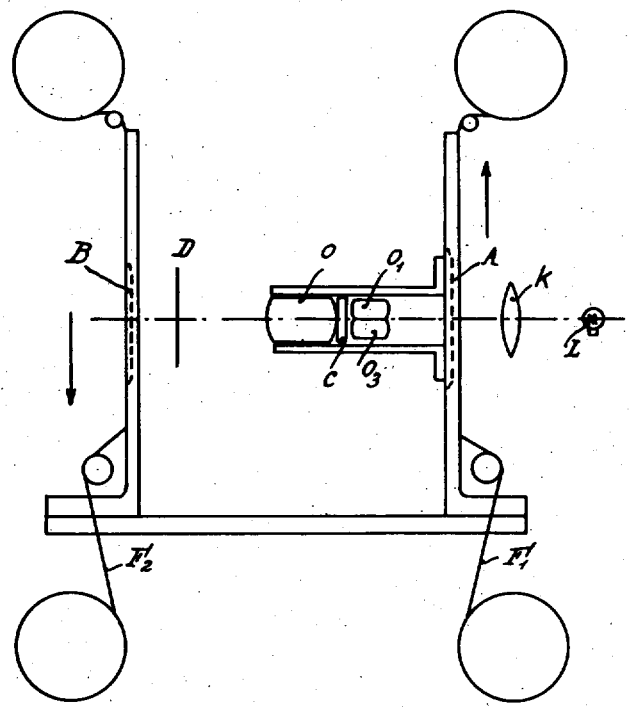
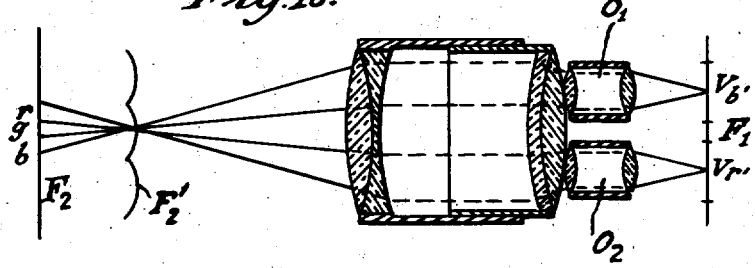
Inventors,
Victor Hudeley,
and Jean Lagrave.
By William C. Linton.
Attorney.

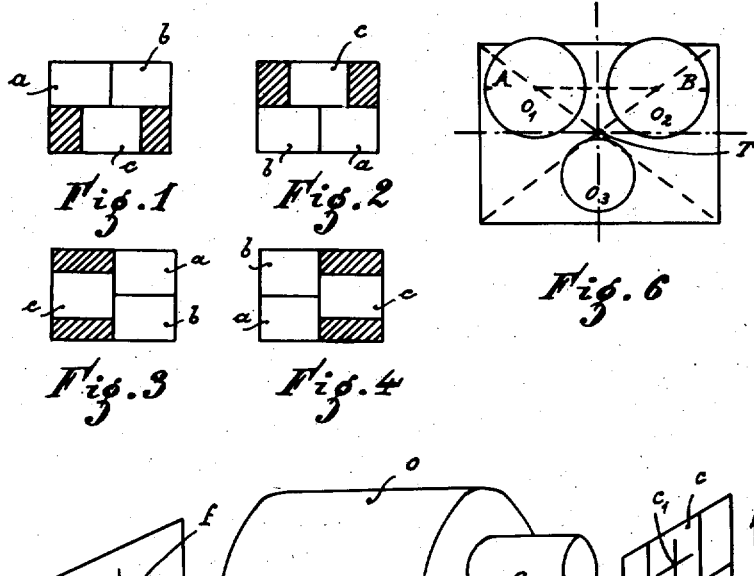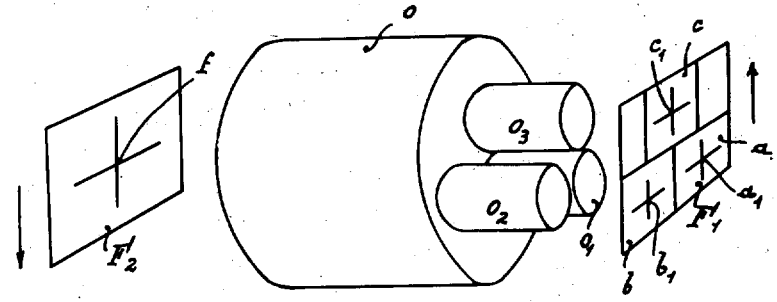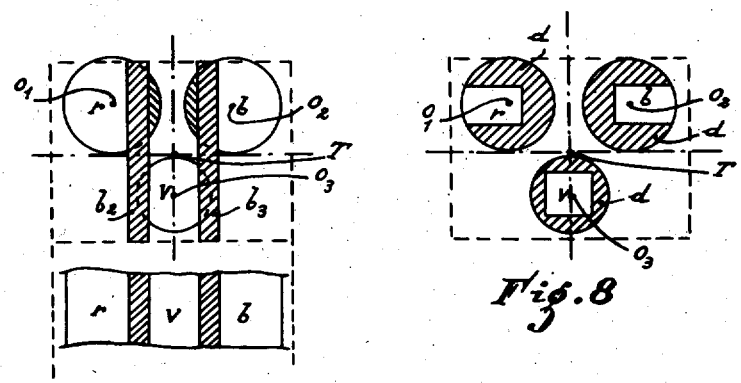

Patented Feb. 11, 1936

2,030,795

UNITED STATES PATENT OFFICE 2,030,795

COLOR CINEMATOGRAPHY

Victor Hudeley, Clichy, and Jean Lagrave, Paris, France

Application January 6, 1934, Serial No. 705,600
In France January 10, 1933

3 Claims. (Cl. 88—24)

Our invention relates to colored motion picture photography, and particularly to the transfer by printing of separate trichrome images which may be recorded on smooth film, to another film which may be lenticulated or reticulated and provided with lenticular elements, and to an optical system adapted for this purpose.

It is known that it is possible to obtain in various manners on film frames of dimensions 18 x 24 millimeters three monochrome pictures each 9 x 12 millimeters.

The projection of the films so obtained implying conditions which are incompatible with commercial production, it has been suggested to obtain by transfer printing of the three monochrome pictures, a single picture of a size of 18 x 24 millimeters on a lenticularly ruled film by means of a device shown diagrammatically in our copending application Serial No. 651,408 filed January 12th, 1933.

It is useful to recall that in taking direct pictures on ruled film each lenticular element produces on the sensitized layer disposed in the neighborhood of the focal plane of the objective used for taking the pictures, the image of a trichrome filter merged or coextensive with the exit pupil.

Under the microscope there will be seen, red, green and blue bands, which for an effective use of the sensitized layer must join together or abut. If it be supposed that the principal objective used has a focal length of 64 millimetres, that it has its filter removed; that there are attached to it in determined positions three small individual selecting objectives each having a focal length of 32 millimetres; that each front lens of the three objectives is suitably provided with a selecting screen (red, green, blue) for the purpose of giving the correctly defined optical effect, and that finally a suitable light source is provided, it will be found that the view in the microscope through the lenticular elements, is exactly the same as if a direct picture were taken on the film provided with lenticular elements.

This having been made clear, it will be easy to understand that the three monochrome pictures, each positioned in the focus of the respective corresponding selecting objective, will now give but a single image on the lenticulated film and that rays, suitably restricted as by a diaphragm, coming from the monochrome selecting objectives will only impress determined parts or bands of the sensitized layer or the lenticulated film, which can be verified by experiment.

On the other hand, the obtaining of this single picture from the three monochrome pictures, necessitates as will be readily understandable, absolute accuracy in setting or positioning which becomes all the more difficult as the transfer takes place onto a film with lenticular elements.

The present invention therefore has among its objects:

1. The description of the characteristics and the conditions which the optical system must give to permit the transfer of monochrome pictures onto a film with lenticular elements;

2. The application of the said optical system to a transfer printer;

3. Means for the exact setting to permit of the exact superposing of the monochrome pictures onto the film with lenticular elements.

Our invention will be better understood from the following description and by reference to the accompanying drawings which show:

Figs. 1 to 4, the positions which can be given to the 9 x 12 images on the 18 x 24 millimeter film.

Fig. 5 an example of realization of the assembly of the optical means seen in perspective;

Figs. 6 to 8 explanatory diagrams of the dimensions and optical relations of the objectives, masks and diaphragms used.

Fig. 9, a printer provided with the optical means of our invention.

Fig. 10 shows a horizontal sectional view of the assembly shown in Fig. 5 through the optical axes of selecting objectives $O_1$ and $O_2$.

It must first of all be noted that it is possible to obtain 9 x 12 images on an 18 x 24 frame without color filters and without panchromatic film, but it is essential that the said 9 x 12 images shall be situated on the 18 x 24 frame of the film in determined positions.

These positions depend on the direction of the ruling with cylindrical lens elements of the film to which transfer is to be made. Thus pictures $a$, $b$, $c$ can be disposed as shown in Figures 1 and 2 if the film is ruled lengthwise, or as shown in Figures 3 and 4 if the film is ruled crosswise, the pictures $a$, $b$, $c$, being interchangeable with each other.

In the case of lengthwise ruling, the trace T (Fig. 6) of the optical axis is disposed in the point of intersection of the diagonals of the 18 x 24 aperture, the straight line joining the axes of the objectives $O_1$ and $O_2$ is 12 millimeters in length and passes 4.5 millimeters above the trace T; the centre of the objective $O_3$ is situated on the vertical axis passing through the said trace and at 4.5 millimeters therefrom.

That is, the base of the isosceles triangle, formed by joining the centers of the partial trichrome images to be transferred, should be perpendicular to the direction of ruling of the cylindrical lens elements of the unexposed film to which transfer is to be made, whether that film is ruled lengthwise or across.

The optical system should preferably satisfy the following conditions:

(a) The exit pupil of the principal objective O (Fig. 5) is preferably at infinity whether the objective is an auto-collimated one or whether additional lenses are used for collimation.

(b) The entrance pupil of the principal objective O should cover in size and position the circle circumscribed about the exit pupils of the trichrome individual selecting objectives $O_1$, $O_2$, $O_3$.

(c) From each point of the 18 x 24 reticulated film to which the pictures are to be transferred it should be possible to see completely the exit pupils of the selecting objectives $O_1$, $O_2$, $O_3$. In other words, the phenomena called "cat's eye", a controlling condition in projection, will be avoided.

(d) If it is assumed: that in taking direct pictures on lenticularly ruled film the pictures of the trichrome screen on the sensitized layer must abut; that there exists a relation between the diameter of the effective diaphragm and the focus of the objective used (for example $D=24$ millimeters for $F.=64$ millimeters and 29 lines to the millimeter) it will be necessary (Fig. 6) that the distance AB shall be about equal to 22 millimeters when the focus of O is 59 millimeters.

(e) The fixed requirement that for the dimensions under consideration, the distance apart of the optical axes of selecting objectives $O_1$ and $O_2$ shall be 12 millimeters and the need for respecting the condition enumerated in item (c) above which imposes for principal objective O lenses of large diameter (opening approximately $F.=1.6$), give for principal objective O a single focal distance approximately 59 millimeters. The focal distance of selecting objectives $O_1$, $O_2$, $O_3$ will therefore be 29.5 millimeters.

(f) The effective diaphragms of $O_1$, $O_2$ will be 9.6 millimeters and that of $O_3$:7 millimeters. The lenses of $O_1$, $O_2$, $O_3$ can be slit but the centering will be much better with round lenses. To avoid objections of a possible shrinkage the axes $O_1$, $O_2$, $O_3$ can be displaced or adjusted in position.

(g) The plane of the entrance pupils of O and the exit pupils of $O_1$, $O_2$, $O_3$ is situated between the two systems in such a manner as to make it possible to interpose a mask or screen or diaphragm or filter to intercept the objectionable luminous rays emanating from the objectives $O_1$, $O_2$, $O_3$; the dark bands $b_2$ and $b_3$ (Fig. 7) corresponding to those used in taking the pictures. To obtain a good use of the silver layer and obtain a practically uniform light flux in the three zones, there is added a vertical diaphragm $d$ (Fig. 8) of suitable form.

(h) The optical system provided with colored filters is suitable for transfer onto a pigmented film or net-work film (such as the Lumière autochrome or Dufay net-work). In this case the conditions above enumerated are no longer all necessary.

(i) The optical system here described allows the recording of sound (the sound track being reserved for this purpose during the recording of the negative).

(j) It is possible, in addition, to reproduce on a band of normal size successively each of the selected three 9 x 12 monochrome pictures (a modification of the printing outfit is then necessary). The band obtained can, in its turn, be transferred on to a lenticulated or reticulated film.

If it is supposed that the recording is effected on a standard film with pictures $a$, $b$, $c$, of 8 x 10.5 millimeters disposed in triangular formation (the steps of the process remaining identical even if a larger size is used) and using the optical system and the printing frame provided in our application Serial Number 651,408 filed January 12, 1933, each monochrome selecting objective $O_1$, $O_2$, $O_3$ being provided with an appropriate filter, it will be seen that on a ground glass screen placed in the focal plane of the single principal objective O, the image of the subject is displaced with the orientation of the eye.

It is impossible, with the ordinary optical system and methods, as above outlined, even by displacing the optical axes of the monochrome selecting objectives, for compensating for the shrinking of the film for instance, to effect a perfect registration of the individual elementary images.

This registration will be obtained by proceeding as hereinafter set out.

Assume that the pictures are being taken on the three separate frames with the three monochrome selecting objectives adjusted to infinity and using a front compound, optical system, permitting of focussing on the principal plane of the subject. If the latter is situated at two meters from the camera, for instance, there will be arranged in the two-meter plane a white sheet bearing a black cross (or vice versa) or any other geometrical form made on the sheet or any other device placed in front of the camera.

Each monochrome selecting objective will give, on the sensitized layer an image of this cross and the three images will have between them no parallax. It will then be easy to cause one of these images (preferably the centre one) to coincide with the image of the cross of the reticule or a ruled net or geometrical figure of a lens specially constructed for this purpose.

When transferring the three partial pictures $a$, $b$, $c$, of the film $F_1$ into a single picture on a single surface $F_2$ (Fig. 5) (which surface can be a reticulated film according to our patent application Serial No. 651,408) the images of the three crosses $a_1$, $b_1$, $c_1$ of the partial pictures $a$, $b$, $c$, will be brought into coincidence with the cross or image of the cross of the reticule or geometrical figure of a focussing collimating eye piece lens specially constructed with this object in view, said eye-piece lens being the same as that serving for the picture taking if necessary.

This collimating eye-piece lens has the cross or other geometrical figure ruled thereon or mounted therein, and may be doubly collimating. In practice it is usually satisfactory to make the superposition of the geometric figures as from the distance of the nearest point that can be focussed on the retina, about 25 centimeters for the normal eye.

The perfect setting or registration of the crosses or geometrical figures on a single point will ensure perfect registration of the different partial images subsequently recorded.

According to what kind of recording means is used, it will be possible to replace the geometrical figure previously referred to as situated at two meters (in the principal focussing plane) by a movable or collapsible panel or device, placed in the optical system and adjusted once and for all.

After a few frames have been exposed with the geometrical figure in the field of view, the geometrical figure may be removed, and the scene taken in usual manner.

Suitable known means are provided for driving the film, such as claws or sprockets.

But to obtain an absolute setting, it is essential at the same time to ensure for the films an exactly controlled path without any side play, in the slides or guides of the printing frame.

For this purpose the claw or sprocket driving means for the printing frame must be provided with co-acting or counter-claws or sprockets eliminating any side play of the films.

The optical arrangement and the setting means obtained as stated above are made use of in the projection printer used for the reproduction of the films. In this printer, the film $F_1$ (Fig. 9) to be reproduced is placed on one side of the above mentioned optical means and the film $F_2$ with lenticular elements, is placed at the other side. The two films are driven with the same intermittent movement and in opposite directions. This movement can be obtained by any suitable known driving means such as a Maltese cross or by claws or by any other mechanical means.

Fig. 10 shows a horizontal sectional view of the assembly of Fig. 5 taken through the optical axes of selecting objectives $O_1$ and $O_2$. The principal objective is shown at O, and the selecting objectives $O_2$ and $O_1$ at $r$ and $b$. The smooth film with partial trichrome images (blue $V_b'$ and red $V_r'$) to be transferred is shown at $F_1$, and the unexposed film at $F_2$ with its lenticular elements $F_2'$. The paths are shown of rays starting from points on $F_1$ to points on $F_2$.

A suitable luminous source L placed on the side of the film $F_1$ carrying the three pictures, illuminates the latter in a uniform manner either by the use of one or three condensers K or in any other optical manner. The film of which the gelatinous surface is turned opposite to the source of illumination is disposed in the guide A in the focal plane of the three selecting objectives $O_1$, $O_2$, $O_3$ and travels vertically from bottom to top, the heads of the pictures being upwards.

The unexposed film $F_2$ of which the lenticular elements are turned towards the principal objective O is placed in the printing frame B and is situated in the focal plane of said objective O. This film receives the same intermittent movement as the film placed in the guide A, but moves in the opposite direction, that is to say, from top to bottom. Reversed pictures are therefore obtained, which are turned suitably for projection. But the direction of displacement of the films could be reversed; as well as the orientation of the faces of the films in relation to the objectives.

During each displacement of the pictures, a shutter D placed between the two films intercepts the luminous rays.

The aperture in front of which the film with lenticular elements moves, may receive a mask or screen adapted to leave a portion unexposed to receive the sound track. It is also possible to reserve a sound track on the negative and on the aperture of the guide B.

There is provided between the groups of three objectives $O_1$, $O_2$, $O_3$ (Fig. 9) and the objective O, a slide holder C in which the masks or screens or diaphragms above referred to are placed.

The optical and mechanical systems herein described and shown are given by way of example. By modifying the operating conditions especially as regards the size or the mechanical means, the scope of the invention will not be exceeded. Thus the lenticular elements can be spherical or cylindrical.

Similarly the form of construction of the device in practice for setting or positioning the films can vary according to the sizes of the films used and that without exceeding the spirit of the invention.

What we claim, is:

1. In the recording of colored motion pictures on a lenticular film employing the intermediate steps of recording three individual partial trichrome images on an intermediate film and transferring and superposing said three images in exact registry on a single frame of said lenticular film notwithstanding shrinkage of said intermediate film, and employing a single front lens in the original taking ahead of three color-selecting objectives, and employing in transfer three adjustably positioned selecting objectives, a principal objective, and a collimating lens comprising a crossed-line figure formed therein, the method of securing exact registry of said three partial images on a single frame of said lenticular film which consists in exposing a crossed-line figure in the focal plane of said single front lens during the original taking of a preliminary frame on said intermediate film, viewing before transfer in said collimating lens the three crossed-line figures formed on said partial images on said intermediate film, and adjusting the positions of said three selecting objectives employed in transfer until said three crossed-line figures formed on said partial images coincide with said crossed-line figure formed in said collimating lens.

2. In the recording of colored motion pictures on a lenticular film employing the intermediate steps of recording three individual partial trichrome images on an intermediate film and transferring and superposing said three images in exact registry on a single frame of said lenticular film notwithstanding shrinkage of said intermediate film, and employing a single front lens in the original taking ahead of three color-selecting objectives, and employing in transfer three adjustably positioned selecting objectives, a principal objective, and a setting collimator unit comprising a crossed-line figure, the method of securing exact registry of said three partial images on a single frame of said lenticular film which consists in exposing a crossed-line figure in the focal plane of said single front lens during the original taking of a preliminary frame on said intermediate film, viewing before transfer in said collimator unit the three crossed-line figures formed on said partial images on said intermediate film, and adjusting the positions of said three selecting objectives employed in transfer until said three crossed-line figures formed on said partial images coincide with said crossed-line figure comprised in said collimator unit when viewed therethrough.

3. In the recording of colored motion pictures on a lenticular film employing the intermediate steps of recording three individual partial trichrome images on an intermediate film and transferring and superposing said three images in exact registry on a single frame of said lenticular film notwithstanding shrinkage of said intermediate film, and employing a single front lens in the original taking ahead of three color-selecting objectives, and employing in transfer three adjustably positioned selecting objectives, a principal objective, and a setting collimator unit comprising a crossed-line figure, the method of securing exact registry of said three partial images on a single frame of said lenticular film which consists in exposing a crossed-line figure in the focal plane of said taking single front lens during the original taking of a preliminary frame on said intermediate film, removing said crossed-line figure from the field of view of said taking front lens, photographing the visual actions with said taking lenses, viewing before transfer in said collimator unit the three crossed-line figures formed on said partial images on said intermediate film, and adjusting the positions of said three selecting objectives employed in transfer until said three crossed-line figures formed on said partial images coincide with said crossed-line figure comprised in said collimator unit when viewed therethrough.

VICTOR HUDELEY.
JEAN LAGRAVE.